United States Patent
Clevenger et al.

(10) Patent No.: US 10,956,675 B2
(45) Date of Patent: Mar. 23, 2021

(54) CLOUD SERVICE SUPPLEMENTING EMBEDDED NATURAL LANGUAGE PROCESSING ENGINE

(71) Applicant: THOMSON LICENSING, Issy de Moulineaux (FR)

(72) Inventors: Brian Duane Clevenger, Muncie, IN (US); Thomas Patrick Newberry, Blaine, WA (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/314,591

(22) PCT Filed: Jun. 1, 2015

(86) PCT No.: PCT/US2015/033480
§ 371 (c)(1),
(2) Date: Nov. 29, 2016

(87) PCT Pub. No.: WO2015/195307
PCT Pub. Date: Dec. 23, 2015

(65) Prior Publication Data
US 2017/0116181 A1    Apr. 27, 2017

Related U.S. Application Data

(60) Provisional application No. 62/014,423, filed on Jun. 19, 2014.

(51) Int. Cl.
*G10L 15/32*    (2013.01)
*G06F 40/30*    (2020.01)
(Continued)

(52) U.S. Cl.
CPC .............. *G06F 40/30* (2020.01); *G06F 9/448* (2018.02); *G06F 9/451* (2018.02); *G06F 40/205* (2020.01);
(Continued)

(58) Field of Classification Search
CPC ................................. G10L 15/32; G10L 15/30
See application file for complete search history.

(56) References Cited

U.S. PATENT DOCUMENTS 5,737,708 A    4/1998  Grob et al.
8,606,581 B1*  12/2013 Quast ..................... G10L 15/32
                                                    704/254

(Continued)

FOREIGN PATENT DOCUMENTS

CA        2461742      4/2003
WO    WO2013168988    11/2013

OTHER PUBLICATIONS

Morris et al.: "Intelligent Natural Language Interface for a Signal Processing System. IEE Proceedings E (Computers and Digital Techniques, vo. 137, No. 5, pp. 371-379, IEE-Inst-Elec Eng, Michael Faraday House Six Hills Way Stevenage, Hertford, England SG1 2AY,", Sep. 1990.

*Primary Examiner* — Feng-Tzer Tzeng
(74) *Attorney, Agent, or Firm* — Patricia A. Verlangieri

(57) ABSTRACT

A system and method are provided. The system includes a gateway portion (201), embedded in a gateway device, having an embedded artificial intelligence engine (220) for processing commands using natural language processing. The system further includes a supplemental cloud server portion (202) having a supplemental artificial intelligence engine (280) for processing, using the natural language processing, the commands unable to be processed by the embedded artificial intelligence engine. The gateway portion (201) further includes a configuration and status interface (Continued)

(230) for performing at least one of diagnostic operations, configuration operations, and status operations, on the gateway device responsive to instructions from any of the embedded artificial intelligence engine and the supplemental artificial intelligence engine.

8 Claims, 3 Drawing Sheets

(51) Int. Cl.

| | | |
|---|---|---|
| *G06F 9/451* | (2018.01) | |
| *H04L 12/24* | (2006.01) | |
| *G06F 40/205* | (2020.01) | |
| *G06F 9/448* | (2018.01) | |
| *G06N 5/02* | (2006.01) | |
| *H04L 12/66* | (2006.01) | |
| *H04L 29/08* | (2006.01) | |
| *G10L 15/30* | (2013.01) | |

(52) U.S. Cl.
CPC ............... *G06N 5/02* (2013.01); *H04L 12/66* (2013.01); *H04L 41/0803* (2013.01); *H04L 41/0813* (2013.01); *H04L 41/16* (2013.01); *G10L 15/30* (2013.01); *G10L 15/32* (2013.01); *H04L 67/28* (2013.01)

(56) References Cited

U.S. PATENT DOCUMENTS

| | | |
|---|---|---|
| 2003/0115353 A1 | 6/2003 | Deryugin et al. |
| 2004/0117189 A1* | 6/2004 | Bennett .................. G06F 17/27 704/270.1 |
| 2005/0086059 A1 | 4/2005 | Bennett |
| 2007/0276651 A1 | 11/2007 | Bliss et al. |
| 2013/0124189 A1 | 5/2013 | Baldwin |
| 2013/0151657 A1 | 6/2013 | Lehman et al. |
| 2013/0211836 A1 | 8/2013 | Jordan et al. |
| 2013/0289996 A1* | 10/2013 | Fry .......................... G10L 15/32 704/257 |
| 2015/0058018 A1* | 2/2015 | Georges .................. G10L 15/08 704/257 |

* cited by examiner

CLOUD SERVICE SUPPLEMENTING EMBEDDED NATURAL LANGUAGE PROCESSING ENGINE

CROSS-REFERENCE TO RELATED APPLICATIONS

This application claims the benefit, under 35 U.S.C. § 365 of International Application PCT/US2015/033480, filed Jun. 1, 2015, which was published in accordance with PCT Article 21(2) on Dec. 23, 2015 in English and which claims the benefit of U.S. Provisional application No. 62/014,423, filed Jun. 19, 2014.

TECHNICAL FIELD

The present principles relate generally to cloud computing and, more particularly, to a cloud service supplementing an embedded natural language processing engine.

BACKGROUND

Natural language processing systems are known. There are examples where a system is implemented entirely as a cloud service such as SIRI® by APPLE®. There are also examples where a system is implemented entirely on a local device. Examples of this would include Clippy by MICROSOFT® that was included with earlier versions of OFFICE® and Dr. Sbaitso developed by Creative Labs.

Cloud based implementations have the advantage of being able to centrally collect usage data that can be used to improve the product as well as simplifying the rollout of updates as updates can be applied to the cloud service without updating the devices that use the cloud service. The big disadvantage of a cloud-only implementation is that a network connection to the cloud service is required. This is especially problematic for a system used to control a gateway device as many configuration options may disrupt connectivity to a cloud service.

Stand-alone implementations have the advantage of being able to function without network connectivity, but lack a means for centralized upgrades and usage data collection.

SUMMARY

These and other drawbacks and disadvantages of the prior art are addressed by the present principles, which are directed to a cloud service supplementing an embedded natural language processing engine.

According to an aspect of the present principles, there is provided a system. The system includes a gateway portion, embedded in a gateway device, having an embedded artificial intelligence engine for processing user commands using natural language processing. The system further includes a supplemental cloud server portion having a supplemental artificial intelligence engine for processing, using the natural language processing, the user commands unable to be processed by the embedded artificial intelligence engine. The gateway portion further includes a configuration and status interface for performing at least one of diagnostic operations, configuration operations, and status operations, on the gateway device responsive to instructions from any of the embedded artificial intelligence engine and the supplemental artificial intelligence engine.

According to another aspect of the present principles, there is provided a method for interfacing with a gateway device. The method includes processing user commands using natural language processing, by an artificial intelligence engine embedded in the gateway device. The method further includes processing, using natural language processing, the user commands unable to be processed by the embedded artificial intelligence engine, by a supplemental artificial intelligence engine in a supplemental cloud server portion disposed remotely from the gateway device. The method also includes performing at least one of diagnostic operations, configuration operations, and status operations, on the gateway device responsive to instructions from any of the embedded artificial intelligence engine and the supplemental artificial intelligence engine.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a cloud service supplementing an embedded natural language processing engine. In conjunction with the cloud service, a gateway device can be located in a home, a business, or some other facility or entity. While primarily directed to making the interaction between the gateway device and a non-technical user become much easier and efficient, the benefits of the present principles also lend themselves to a technical user in terms of ease of use, speed, and other benefits readily identified by one of ordinary skill in the art, given the teachings of the present principles provided herein.

In an embodiment, the present principles are directed to using a cloud service to record interactions that cannot be handled by a natural language processing engine in an embedded device and to using a cloud service to extend the capabilities of a natural language processing engine in an embedded device without requiring a firmware upgrade or other changes to the embedded device.

When implementing a natural language processing system such as this, the set of commands the system can handle and information that can be provided is part of the implementation of the system. In designing such a system, the designer must anticipate the types of questions and commands a user may ask. However, it is likely that users may ask questions and issue commands that were not anticipated. The present principles provide a method of using a cloud service to record these unrecognized commands from a plurality of gateway devices such as, but not limited to set top boxes (STBs), modems, routers, and so forth.

By embedding a language processing engine in a device such as a gateway, enhancements to the language processing engine such as capabilities to handle new commands would require each device to be updated using a firmware upgrade or some similar means. The providing of firmware updates to a large number of devices presents logistical issues both in the qualification of new firmware and in the actual mechanics of updating a large number of gateways. This makes it impractical to provide frequent updates to a natural language processing engine on an embedded device. The present principles solve this problem by allowing the native language processing engine on an embedded device to work in conjunction with a language processing engine implemented as a cloud service that can be updated more frequently without the logistical issues of upgrading each embedded device.

Thus, in an embodiment, the present principles advantageously use a hybrid solution that allows most commands to be handled locally without requiring a network connection while still providing the benefits of centralized upgrade and usage data collection of cloud based services.

Figure 1:
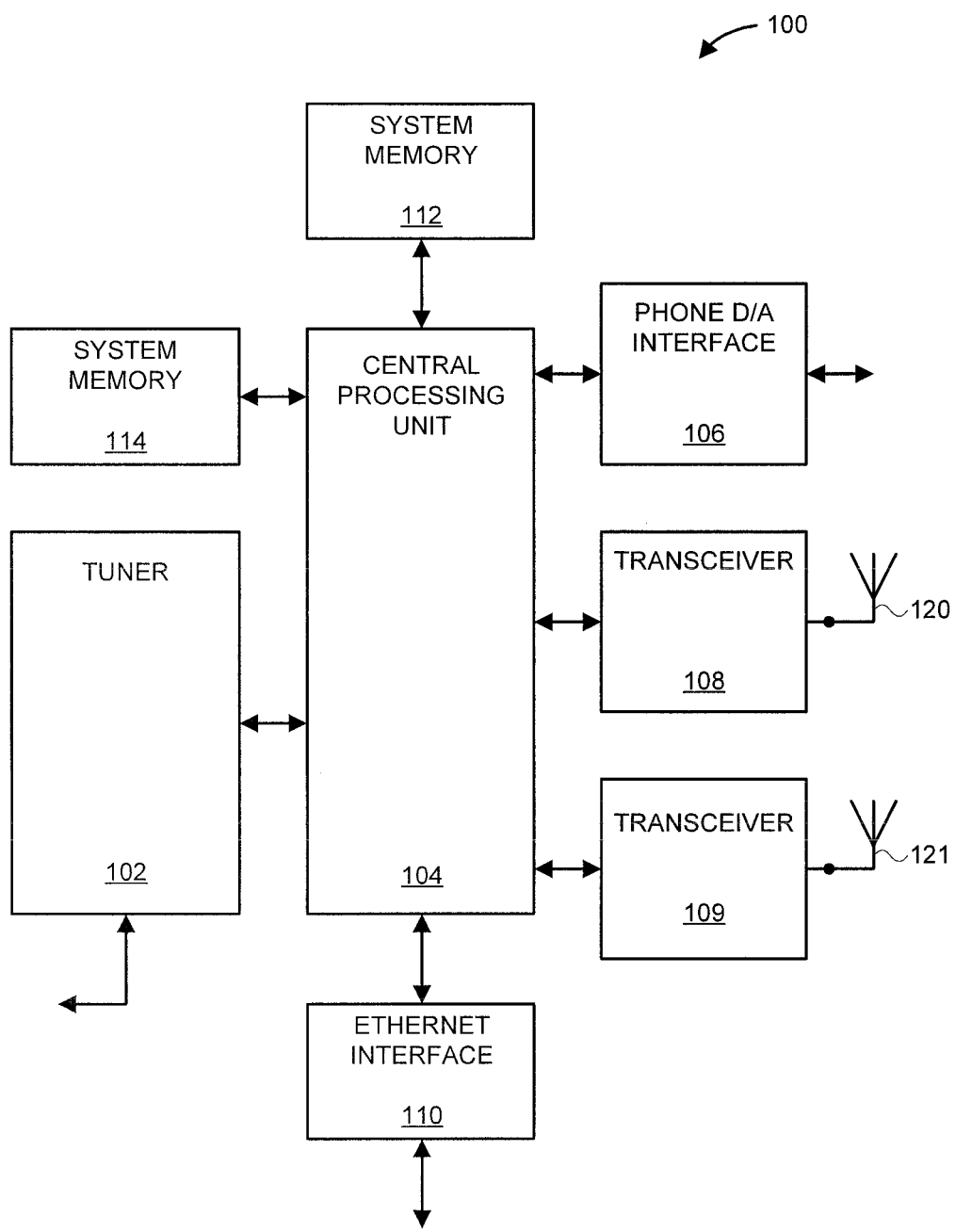
FIG. 1 shows a hardware block diagram of an exemplary gateway device 100 to which the present principles can be applied, in accordance with an embodiment of the present principles.

FIG. 1 shows a hardware block diagram of an exemplary gateway device 100 to which the present principles can be applied, in accordance with an embodiment of the present principles. Of course, it is to be appreciated that the present principles are not limited to the gateway device 100 shown and described in FIG. 1 and, thus, other gateway devices 100 having, e.g., different configuration and/or different elements, can also be used in accordance with the teachings of the present principles.

In gateway device 100, an input signal is provided to RF input 101. RF input 101 connects to tuner 102. Tuner 102 connects to central processor unit 104. Central processor unit 104 connects to phone D/A interface 106, transceiver 108, transceiver 109, Ethernet interface 110, system memory 112, and user control 114. Transceiver 108 further connects to antenna 120. Transceiver 109 further connects to antenna 121. It is important to note that several components and interconnections necessary for complete operation of gateway device 100 are not shown in the interest of conciseness, as the components not shown are well known to those skilled in the art. Gateway device 100 may be capable of operating as an interface to a cable or DSL communication network and further may be capable of providing an interface to one or more devices connected through either a wired and wireless network.

A signal, such as a cable or DSL signal on the WAN, is interfaced to tuner 102 through RF input 101. Tuner 102 performs RF modulation functions on a signal provided to the WAN and demodulation functions on a signal received from the WAN. The RF modulation and demodulation functions are the same as those commonly used in communication systems, such as cable or DSL systems. Central processor unit 104 accepts the demodulated cable or DSL signals and digitally processes the signal from tuner 102 to provide voice signals and data for the interfaces in gateway 100. Similarly, central processor unit 104 also processes and directs any voice signals and data received from any of the interfaces in gateway 100 for delivery to tuner 102 and transmission to the WAN.

System memory 112 supports the processing and IP functions in central processor unit 104 and also serves as storage for program and data information. Processed and/or stored digital data from central processor unit 104 is available for transfer to and from Ethernet interface 110. Ethernet interface may support a typical Registered Jack type RJ-45 physical interface connector or other standard interface connector and allow connection to an external local computer. Processed and/or stored digital data from central processor unit 104 is also available for digital to analog conversion in interface 106. Interface 106 allows connection to an analog telephone handset. Typically, this physical connection is provided via an RJ-11 standard interface, but other interface standards may be used. Processed and/or stored digital data from central processor unit 104 is additionally available for exchange with transceiver 108 and transceiver 109. Transceiver 108 and transceiver 109 can both support multiple operations and networked devices simultaneously. Central processor unit 104 is also operative to receive and process user input signals provided via a user control interface 114, which may include a display and/or a user input device such as a hand-held remote control and/or other type of user input device.

It is important to note that devices employing multiple antennas and in some cases multiple transceivers or transmit/receive circuits, such as the cable or DSL gateways or other networking devices, may operate in a number of transmit and receive modes. In one mode, only one antenna (and one transceiver circuit) is used for both transmission and reception, known as single input single output (SISO) mode. In a second mode, only one antenna is used for transmission and more than one antenna (using one or more transceiver circuits) may be used for reception, known as multiple input single output (MISO) mode. In a third mode, more than one antenna (using one or more transceiver circuits) may be used for transmission while only one antenna is used for reception, known as single input multiple output (SIMO) mode. Finally, more than one antenna (using one or more transceiver circuits) may be used for transmission and reception, known as multiple input multiple output (MIMO) mode.

In the embodiment of FIG. 1, users would attach to the gateway device 100 (also referred to herein as "gateway" in short) using a standard web browser connected via the wireless connection provided by any of the transceivers 108 and 109 or using a wired Ethernet connection provided by the wired Ethernet interface 110. The GUI would be implemented by a hypertext transfer protocol (HTTP) server running on the CPU 104 which would interact with an AI engine running on the CPU 104 to interpret requests from the user and generate appropriate responses. Alternatively, the server and AI engine can be implemented as standalone components or be part of other components shown in FIG. 1. The server and AI engine are further described with respect to system 200 of FIG. 2

Figure 2:
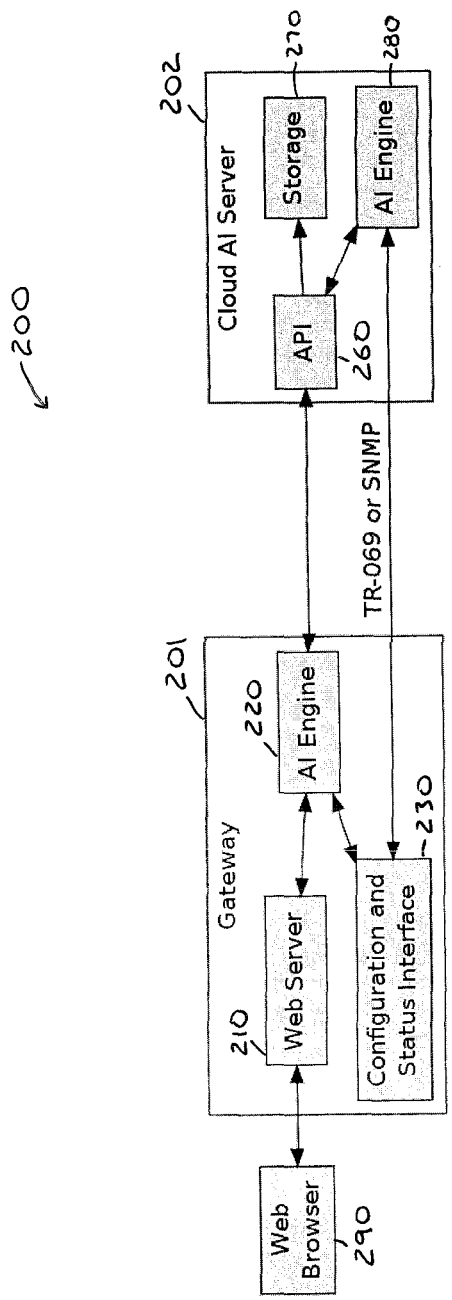
FIG. 2 shows a hardware block diagram of an exemplary system 200 having an artificial intelligence (AI) engine embedded in a gateway device supplemented by a second AI engine implemented as a cloud service, in accordance with an embodiment of the present principles.

FIG. 2 shows a hardware block diagram of an exemplary system 200 having an artificial intelligence (AI) engine embedded in a gateway device supplemented by a second AI engine implemented as a cloud service, in accordance with an embodiment of the present principles. The gateway device can be gateway 100 shown and described with respect to FIG. 1, or some other gateway device. For the sake of illustration, the following description will make reference to the gateway 100 of FIG. 1.

The system 200 includes a gateway portion (hereinafter interchangeably referred to as "gateway" in short) 201 and a cloud AI server portion (hereinafter interchangeably referred to as "cloud AI server" in short) 202. The gateway 201 includes a web server 210, an embedded artificial intelligence (AI) engine (hereinafter interchangeably referred to as "gateway AI engine") 220, and a configuration and status interface 230. The cloud AI server 202 includes an application programming interface (API) 260, a storage device 270, and a supplemental artificial intelligence (AI)

engine 280. The gateway 201 can be a stand-alone system within the gateway device 100, or can be integrated into one or more existing elements of the gateway device 100.

The user interacts with the gateway 100 via a chat window presented in a web browser of the web browser client 290. While only one web browser client 290 is shown for the sake of illustration, it is to be appreciated that the present principles can be used with multiple web browser clients. Commands from the user of the web browser client 290 entered in the chat window are sent to the web server 210 in the gateway 100 which forwards the command to the AI engine 220 in the gateway 100. The AI engine 220 attempts to process the command, using the configuration and status interface 230 as required to make configuration changes and gather data necessary to formulate a response.

In an embodiment, the configuration and status interface 230 assists (the artificial intelligence engine 220) in the processing of the at least some of the received user commands by interfacing with other elements of the gateway device 100 that configure the gateway device 100 and/or maintain a status of the gateway device 100 and/or perform diagnostics on the gateway device 100.

If the AI engine 220 is able to interpret the user's command and formulate a response, the response is sent to the web server 210 which, in turn, sends the response to the user. However, if the AI engine 220 is unable to formulate a response, the original request from the user is sent to the cloud AI server 202 using the API 260. The cloud AI server 202 records the request in local storage device 270. These stored requests can later be retrieved and analyzed by an engineer to make improvements to the AI engines 220 and 280.

In addition to storing the request, the cloud AI server 202 sends the request to its own AI engine 280 for processing. The cloud server's AI engine 280 communicates with the configuration and status interface 230 using a management protocol such as Technical Report-069 (TR-069) or simple network management protocol (SNMP) to apply any necessary configuration changes and gather any information required to process the user's request and formulate a response.

If the cloud AI server 202 is able to process the request and formulate a response, the response is sent to the AI engine 220 on the gateway which, in turn, forwards it to the web server 210 which then forwards it to the web browser client 290. If the cloud AI server 202 is unable to process the request, an error indication is sent to the gateway 201.

If the gateway 201 is unable to process a request locally, and the cloud AI server 202 returns an error indication or the gateway 201 is unable to contact the cloud AI server 202 due to a network outage or similar condition, the AI engine 220 sends a standard error message to the web server 210 to be presented to the web browser client 290 such as, for example, "I'm sorry. I don't understand" or "Unable to connect, please try again later", etc.

In an embodiment, the web browser client 290 can be any of, but are not limited to, a mobile telephone, a mobile computer, a desktop computer, a tablet, a personal digital assistant, or a media player. The web browser client 290 is capable of implementing a web browser and is further capable of connecting to the gateway device using wireless technology (e.g., Bluetooth, an 802.11 protocol, etc.) or wired technology (Ethernet, universal serial bus (USB), firewire, and so forth).

In an embodiment, the gateway device 100 can be any of, but is not limited to, a set top box, a modem, a router, a network switch, a voice over Internet Protocol (VoIP) telephone adapter, a wireless access point, and so forth.

Figure 3:
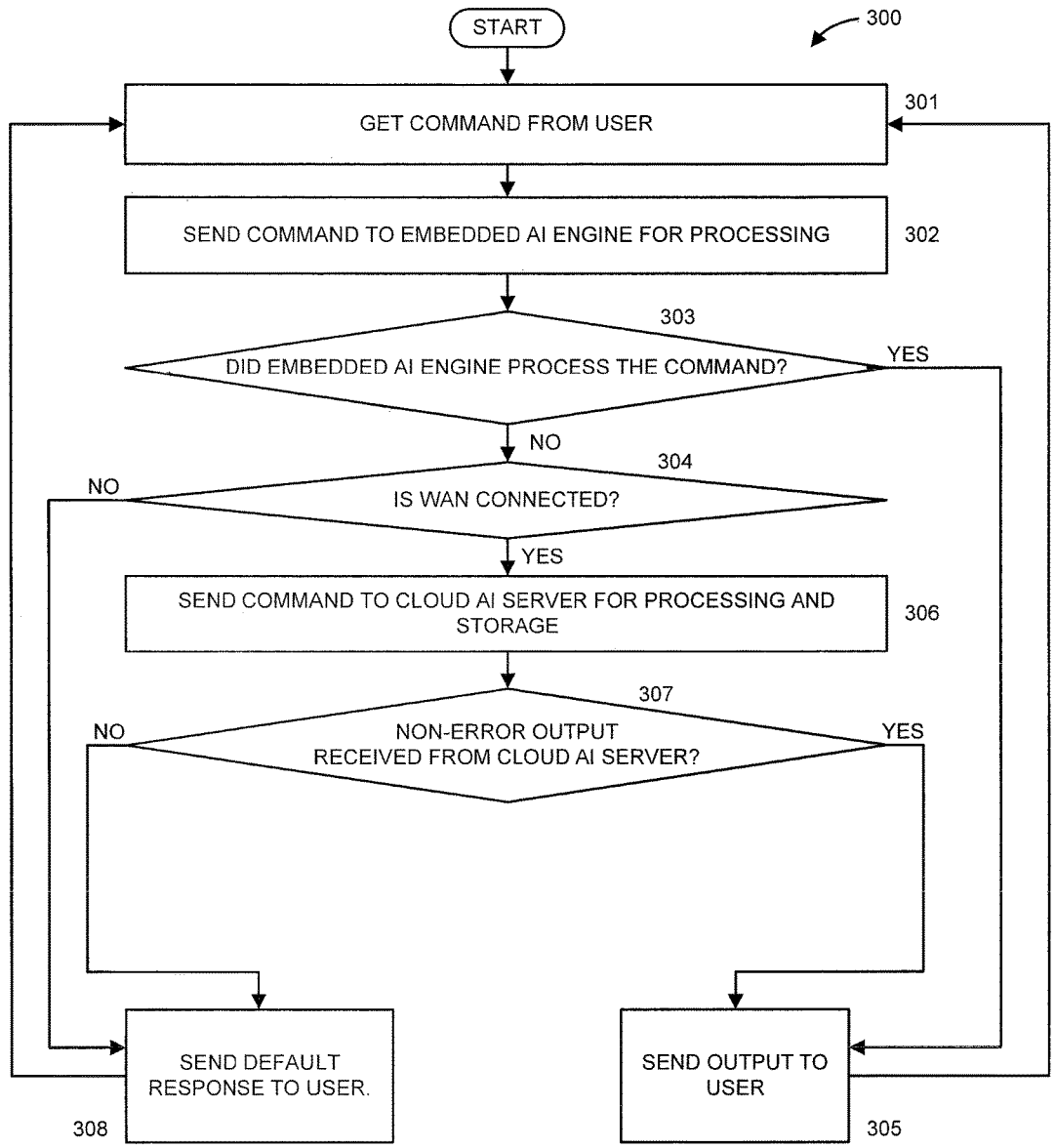
FIG. 3 shows a flow diagram of an exemplary method 300 for supplementing an embedded natural language artificial intelligence (AI) processing engine using a cloud service, in accordance with an embodiment of the present principles.

FIG. 3 shows a flow diagram of an exemplary method 300 for supplementing an embedded natural language artificial intelligence (AI) processing engine using a cloud service, in accordance with an embodiment of the present principles.

At step 301, a (new) command is received from the user (web browser client 290).

At step 302, the command is sent to the gateway AI engine 220.

At step 303, it is determined whether or not the gateway AI engine 220 can process the command. If so, the method proceeds to step 305. Otherwise, the method proceeds to step 304.

At step 305, the command is processed by the gateway AI engine 220, e.g., using natural language processing, a response to the command is sent from the AI engine 220 to the user (web browser client 290), and the method returns to step 301 to receive a next command from the user (web browser client 290). Processing of the command by the gateway AI engine 220 can involve, but is not limited to diagnostic operations, and/or configuration operations, and/or status operations. The response can include, but is not limited to, diagnostics information, and/or configuration information, and/or status information.

At step 304, it is determined whether or not there is WAN connectivity. If so, then the method proceeds to step 306. Otherwise, the method proceeds to step 308. While described with respect to WAN connectivity, it is to be appreciated that other forms of connectivity can also be used.

At step 308, a default response is presented to the user (web client browser 290) such as, for example, "I'm sorry. I don't understand", and the method returns to step 301 to receive a next command from the user (web browser client 290).

At step 306, the command is sent to the cloud AI server 202 for processing by the supplemental AI engine 280, e.g., using natural language processing. Processing of the command by the supplemental AI engine 280 can involve, but is not limited to diagnostic operations, and/or configuration operations, and/or status operations. Also, step 306 includes storing of the command that was unable to be processed by the embedded artificial engine 220 for later use in improving the response capabilities of the embedded artificial engine.

At step 307, it is determined whether or not a non-error output is received from the cloud AI server 202. If so, then the method proceeds to step 305. Otherwise, the method proceeds to step 308.

The present description illustrates the present principles. It will thus be appreciated that those skilled in the art will be able to devise various arrangements that, although not explicitly described or shown herein, embody the present principles and are included within the present principles.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope of the present principles. All such changes and modifications are intended to be included within the scope of the present principles as set forth in the appended claims.

The invention claimed is:

1. A device, comprising:
a processor;
an embedded artificial intelligence engine coupled to the processor, wherein the embedded artificial intelligence engine is configured to perform an evaluation of commands using natural language processing,
wherein in response to a result of the evaluation, the embedded artificial intelligence engine is configured to perform at least one of,
initiating at least one of an execution of a diagnostic routine, a change of a configuration of the device, and a determination of a status of the device, and
providing at least one of diagnostics information, configuration information, and status information, and
wherein, if the artificial intelligence engine is unable to evaluate a command using natural language processing, the processor is configured to send the command to a server and provide a response from the server.

2. The device of claim 1, further comprising an interface, wherein the embedded artificial intelligence engine initiates a configuration change using the interface, responsive to a command including a configuration change request.

3. The device of claim 1, further comprising a web server for initially receiving the commands from a remote device and for supporting a chat dialog with the remote device.

4. The device of claim 1, wherein the device is any of a set top box, a modem, a router, a network switch, a voice over Internet Protocol telephone adapter, and a wireless access point.

5. A method, comprising:
performing an evaluation of commands using natural language processing by an embedded artificial intelligence engine coupled to a processor of a device;
wherein, responsive to a result of the evaluation, at least one of:
initiating at least one of an execution of a diagnostic routine on the device, a change of a configuration of the device, and a determination of a status of the device; and
providing at least one of diagnostics information, configuration information, and status information;
sending the commands to a server disposed remotely to the device if the embedded artificial intelligence engine is unable to process a command using natural language processing; and
receiving a response from the server.

6. The method of claim 5, further comprising storing the commands unable to be processed by the embedded artificial intelligence engine in a storage device for subsequent analysis to improve corresponding response capabilities of the embedded artificial intelligence engine.

7. The method of claim 1, further comprising initiating a configuration change to the device using an interface, responsive to a command including a configuration change request.

8. The method of claim 1, further comprising supporting, by the device, a chat dialog capability.

* * * * *